(No Model.) 2 Sheets—Sheet 1.
G. W. ROGERS.
STALK PULLER.
No. 396,894. Patented Jan. 29, 1889.
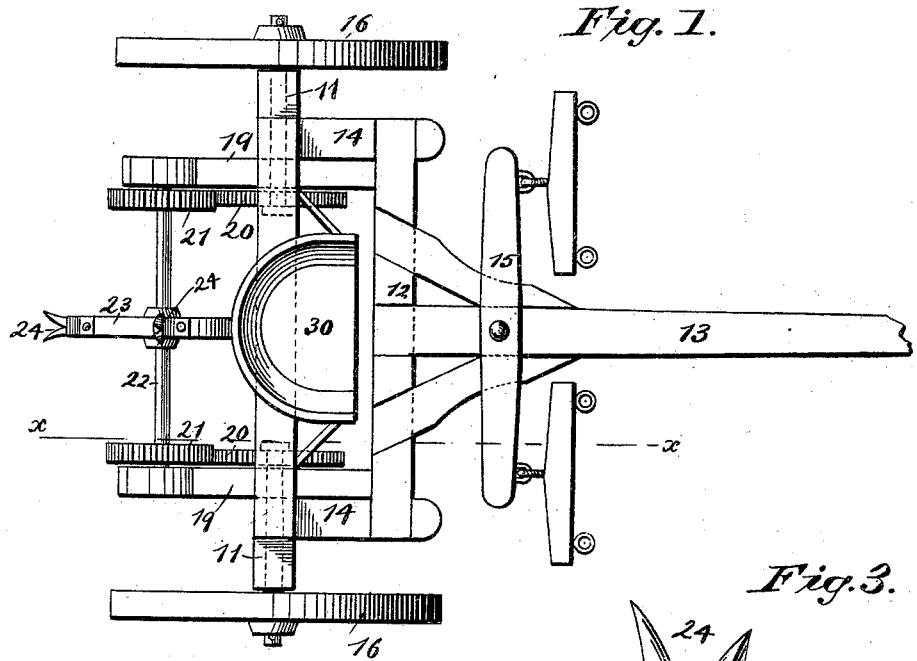
Fig. 1.
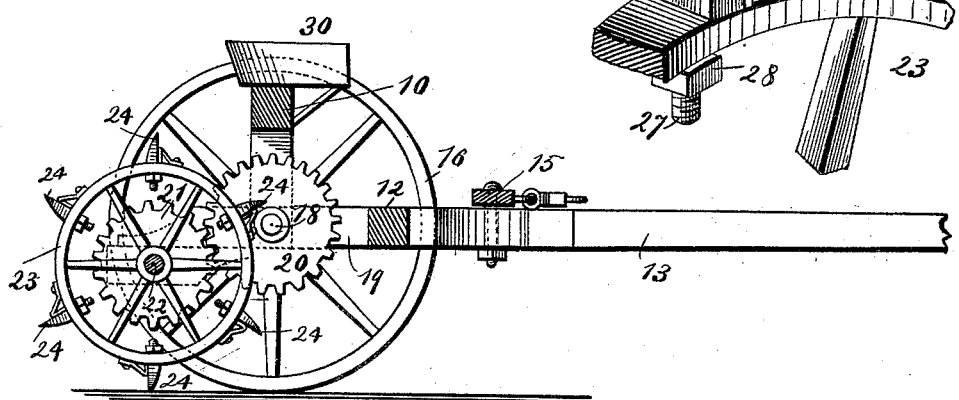
Fig. 2.
Fig. 3.
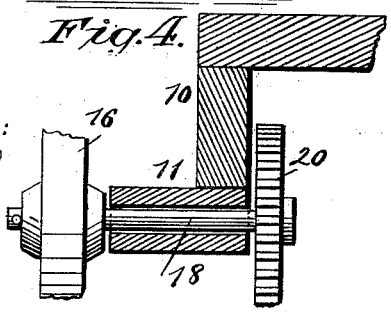
Fig. 4.
WITNESSES:
Phil. C. Dietrich.
C. Sedgwick.
INVENTOR
G. W. Rogers
BY
Munn & Co.
ATTORNEY (No Model.) 2 Sheets—Sheet 2.

G. W. ROGERS.
STALK PULLER.

No. 396,894. Patented Jan. 29, 1889.

WITNESSES:
Phil C. Dietrich.
C. Sedgwick.

INVENTOR,
G. W. Rogers
BY Munn & Co.
ATTORNEYS.

UNITED STATES PATENT OFFICE.

GEORGE WASHINGTON ROGERS, OF BALTIMORE, MARYLAND.

STALK-PULLER.

SPECIFICATION forming part of Letters Patent No. 396,894, dated January 29, 1889.

Application filed May 10, 1888. Serial No. 273,427. (No model.)

*To all whom it may concern:*

Be it known that I, GEORGE WASHINGTON ROGERS, of Baltimore, in the State of Maryland, have invented a new and useful Improvement in Stalk-Pullers, of which the following is a full, clear, and exact description.

My invention relates to an improvement in stalk-pullers, and has for its object to provide a simple, inexpensive, and conveniently-manipulated apparatus which will effectually clear the ground of all stalks of cotton or corn when the said apparatus is driven over the rows, leaving the field in proper condition for the plowing and the sowing of another crop.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 5:
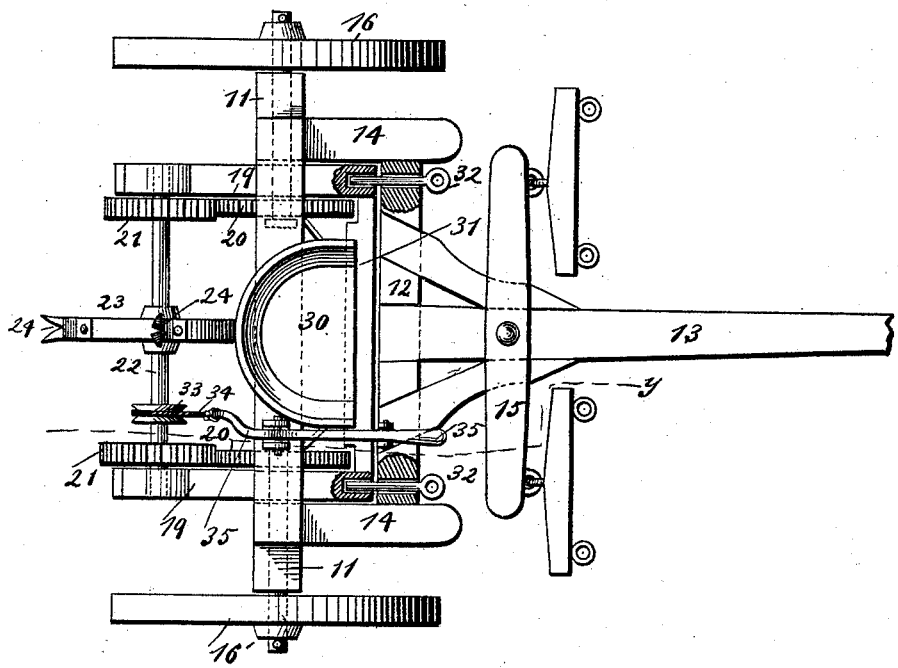
Figure 6:
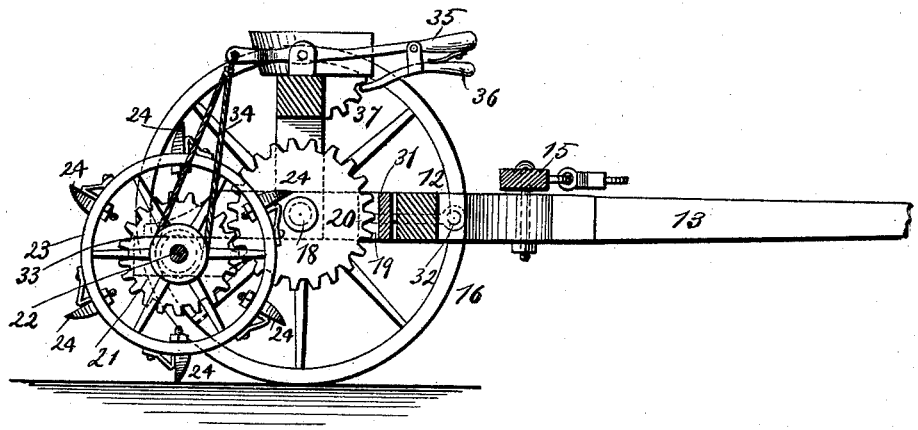

Figure 1 is a plan view of the apparatus. Fig. 2 is a section on line x x of Fig. 1. Fig. 3 is a detail sectional view of a portion of the extracting-wheel. Fig. 4 is a detail sectional view of one of the journal-bearings of the drive-shaft. Fig. 5 is a plan view, partly in section, of a modified form of my apparatus; and Fig. 6 is a section on line y y of Fig. 5.

The frame of the implement consists of a yoke, 10, provided near the end, upon the outer side, with attached blocks 11, which blocks stand horizontally and at right angles to the said yoke, as best shown in Fig. 4. The frame further consists of a front bar, 12, to which the tongue 13 is attached in any suitable or approved manner, the said front bar being attached to the front sides of the yoke 10 by means of the parallel side beams, 14, as best shown in Fig. 1. Upon the tongue 13 a whiffletree, 15, is pivoted.

The wheels 16 and 16' are attached to separate and independent axles 18, which axles are journaled in the blocks 11 and the lower end of the yoke 10, projecting inward beyond said yoke, and also through side arms, 19, which arms are secured, one at each side, to the inner face of the side beams, projecting rearward, and preferably being curved downward, as best shown in Fig. 1.

To each inner end of the respective axles 18 a gear-wheel, 20, is secured, which gears are adapted to mesh with similar gears, 21, fast upon a transverse shaft, 22, which shaft is journaled in the extremities of the arms 19.

Upon the shaft 22, about centrally the same, a wheel, 23, is secured, which wheel is provided upon its periphery with a series of spaced pronged teeth, 24, as shown in detail in Fig. 3. The teeth 24 consist of two outwardly-curved members, 25 and 26, the inner or contiguous edges of which are sharpened to constitute the cutting-edges. The teeth are preferably secured to the wheel through the medium of a threaded shank, 27, integral with the under side, which shank is passed through an aperture in the periphery of the wheel and held in a fixed position by a locknut, 28.

The front faces of the several members 25 and 26 of the teeth 24 are inwardly beveled the better to receive the stalk, and the said teeth are supported at the rear by means of an angular bracket, 29, which bracket has a bearing upon the rear of the teeth and also upon the wheel, being attached to the wheel through the latter bearing portion, as best illustrated in Fig. 3. Centrally upon the upper face of the yoke 10 a seat, 30, is preferably attached.

In Figs. 1 and 2 I have illustrated a form of implement in which the extracting-wheel is non-adjustable. In Figs. 5 and 6 I illustrate a means of vertically adjusting said wheel—that is to say, a means whereby it may be lifted from the ground when not desired for use. To this end the side arms, 19, are pivoted upon the several axles 18 and united at their forward ends by means of an attached crossbar, 31. The inner frame, thus provided, and consisting of the said side bars and front crossbar, is held normally in a horizontal position in the same plane with the other frame by pins 32, projected through apertures in the front cross-bar of the outer frame into a socket produced in the similar cross-bar of the inner frame, as best illustrated in Fig. 5.

As a means of manipulating the shaft 22 a grooved pulley, 33, is secured upon said shaft at one side of the extracting-wheel, around which pulley a chain or rope, 34, is passed to a connection with one end of a lever, 35, fulcrumed upon the upper face of the yoke, to the right of the driver. The lever 35 is provided with a spring-actuated catch, 36, which catch is adapted for engagement with a segmental rack, 37, also secured to the yoke, as illustrated in Fig. 6. Thus by removing the pins 32 and manipulating the lever 35 the extracting-wheel may be raised or lowered at will. When the apparatus is in operation, however, the pins 32 are inserted to prevent the extracting-wheel from being lifted from the ground.

The extracting-wheel may be made of any suitable or desired material—such as wood or metal—and may be either solid or hollow, and, if found desirable, other means may be employed for gearing the shaft with the drive-wheels, and also for lifting said shaft. Thus, in general, I desire it to be understood that, although a specific construction has been described, other equivalent construction may be substituted without departing from the spirit of the invention.

When it is desired to extract the stalks, the implement is so driven as that the wheel will travel upon the line upon which the stalks are planted. As the wheel revolves, the stalks are caught between the contiguous edges of the toothed members 25 and 26 and are quickly uprooted and thrown upon the ground.

It is not purposed that the inner contiguous edges of the toothed members 25 and 26 should cut the stalks, but be simply sharp enough to clamp and retain the same to effectually pull them from the ground.

Having thus described my invention, what I claim as new, and desire to secure by Letters Patent, is—

1. A stalk-puller comprising a frame having opposite axles carrying drive-wheels and gears, a shaft journaled in rear of said axles and provided with end gears meshing into said axle-gears, a wheel, 23, also on said shaft, and the teeth 24, having threaded shanks 27 extending through the rim of the wheel and provided with nuts, and said teeth being bifurcated to form two outwardly-curved members, 25 26, substantially as set forth.

2. The combination, with the stalk-pulling wheel 23, of the teeth 24, having threaded shanks 27 extending through the rim of the wheel, provided with nuts 28, and the braces 29, secured to the rim and bearing against the rear sides of the teeth, substantially as set forth.

3. In a stalk-puller, the bifurcated tooth 24, formed with outwardly-curved members 25 26 and with a threaded shank at its base, substantially as set forth.

4. The combination, with the main frame having transversely-apertured front bar, 12, and drive-wheels, of the inner frame, having side bars, 19, mounted on the axles to swing vertically independent of the main frame, and connected at their front ends by a cross-bar, 19, having apertures in line with those in bar 12, the shaft 22, mounted in the rear ends of bars 19, the wheel 23 on said shaft and provided with bifurcated teeth 24, having outwardly-curved members 25 26, gearing connecting said shaft with the drive-wheels, pins 32, connecting the bars 12 31, and mechanism for raising the rear end of the inner frame upon the removal of said pins, substantially as set forth.

GEORGE WASHINGTON ROGERS.

Witnesses:
M. A BLAKELEY,
LEW GLAZENER.